(12) United States Patent
Schwartz et al.

(10) Patent No.: US 10,594,669 B2
(45) Date of Patent: *Mar. 17, 2020

(54) MOBILE SECURITY OFFLOADER

(71) Applicant: JPU.IO LTD, Israel (IL)

(72) Inventors: Jonathan Schwartz, Tel Aviv (IL); Franck Malka, Kfar Yona (IL)

(73) Assignee: JPU.IO LTD, Petach Tikva (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/249,441

(22) Filed: Jan. 16, 2019

(65) Prior Publication Data

US 2019/0149528 A1    May 16, 2019

Related U.S. Application Data

(63) Continuation of application No. 15/098,899, filed on Apr. 14, 2016, now Pat. No. 10,225,241.

(Continued)

(51) Int. Cl.
*H04L 29/06* (2006.01)
*H04W 12/10* (2009.01)
(Continued)

(52) U.S. Cl.
CPC ........ *H04L 63/0471* (2013.01); *G06F 21/602* (2013.01); *H04L 63/0485* (2013.01);
(Continued)

(58) Field of Classification Search
CPC ............. H04L 63/0471; H04L 63/0485; H04L 63/0876; H04W 12/10; H04W 12/06; G06F 21/602
See application file for complete search history.

(56) References Cited

U.S. PATENT DOCUMENTS

| 10,225,241 B2 | 3/2019 | Schwartz et al. |
| 2007/0143824 A1* | 6/2007 | Shahbazi ............. H04L 63/083 726/1 |

(Continued)

FOREIGN PATENT DOCUMENTS

| CN | 109155779 A | 1/2019 |
| JP | 2019511149 A | 4/2019 |
| WO | WO-2017137959 A1 | 8/2017 |

OTHER PUBLICATIONS

"European Application Serial No. 17707406.9, Response Filed Jan. 18, 2019 to Communication pursuant to Rules 161(2) and 162 EPC dated Sep. 19, 2018", 13 pgs.

(Continued)

*Primary Examiner* — J. Brant Murphy
(74) *Attorney, Agent, or Firm* — Schwegman Lundberg & Woessner, P.A.

(57) ABSTRACT

In an example embodiment, a mobile security offloader (MSOL) is provided. Within the MSOL, a mobile device identification component is used to receive unencrypted data from a mobile device in a mobile radio network and to determine a mobile device identification of the mobile device from the unencrypted data. A security profiles directory interface then uses the mobile device identification to retrieve a security profile corresponding to the mobile device identification from a security profiles directory, the security profile identifying a security protocol for encrypting data from the mobile device corresponding to the mobile device identification. An encryption engine is used to encrypt the unencrypted data using the security protocol identified in the security profile. A packet switched network interface is then used to route the encrypted data to a secured server identified in the data via a packet switched network.

23 Claims, 14 Drawing Sheets

Related U.S. Application Data

(60) Provisional application No. 62/294,482, filed on Feb. 12, 2016.

(51) Int. Cl.
   *G06F 21/60* (2013.01)
   *H04W 12/06* (2009.01)

(52) U.S. Cl.
   CPC ......... *H04L 63/0876* (2013.01); *H04W 12/06* (2013.01); *H04W 12/10* (2013.01)

(56) References Cited

U.S. PATENT DOCUMENTS

| | | | | |
|---|---|---|---|---|
| 2008/0022094 | A1* | 1/2008 | Gupta | H04L 63/0485 713/165 |
| 2008/0127320 | A1* | 5/2008 | De Lutiis | H04L 29/12216 726/9 |
| 2008/0175382 | A1* | 7/2008 | Gearhart | H04L 63/0209 380/255 |
| 2009/0227274 | A1* | 9/2009 | Adler | H04L 63/0272 455/466 |
| 2011/0289308 | A1* | 11/2011 | Sobko | G06F 21/55 713/100 |
| 2012/0076120 | A1* | 3/2012 | Kovvali | H04W 76/11 370/338 |
| 2012/0198236 | A1* | 8/2012 | Brown | H04L 9/0844 713/171 |
| 2013/0219168 | A1* | 8/2013 | Gearhart | H04L 63/0485 713/153 |
| 2013/0219456 | A1* | 8/2013 | Sharma | H04L 63/0815 726/1 |
| 2013/0288644 | A1* | 10/2013 | Schroeder | H04W 12/06 455/411 |
| 2014/0161028 | A1* | 6/2014 | Maria | H04W 80/045 370/328 |
| 2014/0321646 | A1* | 10/2014 | Ksontini | H04L 63/0853 380/247 |
| 2015/0358161 | A1* | 12/2015 | Kancharla | H04L 63/0485 713/164 |
| 2015/0365435 | A1* | 12/2015 | Billau | H04L 63/20 726/1 |
| 2015/0372994 | A1* | 12/2015 | Stuntebeck | H04L 63/0464 713/156 |
| 2016/0150467 | A1* | 5/2016 | Shaw | H04W 48/18 370/329 |
| 2016/0366181 | A1* | 12/2016 | Smith | H04L 63/102 |
| 2017/0237719 | A1 | 8/2017 | Schwartz et al. | |

OTHER PUBLICATIONS

"International Application Serial No. PCT/IB2017/050772, Response filed Mar. 7, 2018 to Written Opinion dated Jan. 8, 2018", 6 pgs.

"International Application Serial No. PCT/IB2017/050772, Response filed Mar. 26, 2018 to Written Opinion dated Jan. 8, 2018 and Response to Written Opinion filed Mar. 7, 2018", 7 pgs.

"International Application Serial No. PCT/IB2017/050772, Response filed Aug. 9, 2017 to Written Opinion dated Apr. 7, 2017", 4 pgs.

"U.S. Appl. No. 15/098,899, Examiner Interview Summary dated Sep. 18, 2018", 4 pgs.

"U.S. Appl. No. 15/098,899, Final Office Action dated Jul. 12, 2018", 22 pgs.

"U.S. Appl. No. 15/098,899, Non Final Office Action dated Feb. 8, 2018", 20 pgs.

"U.S. Appl. No. 15/098,899, Notice of Allowance dated Oct. 31, 2018", 10 pgs.

"U.S. Appl. No. 15/098,899, Response filed Jun. 8, 2018 to Non Final Office Action dated Feb. 8, 2018", 10 pgs.

"U.S. Appl. No. 15/098,899, Response filed Sep. 12, 2018 to Final Office Action dated Jul. 12, 2018", 12 pgs.

"International Application Serial No. PCT/IB2017/040772, International Preliminary Report on Patentability dated Apr. 24, 2018", 14 pgs.

"International Application Serial No. PCT/162017/050772, International Search Report dated Apr. 7, 2017", 4 pgs.

"International Application Serial No. PCT/IB2017/050772, Written Opinion dated Jan. 8, 2018", 5 pgs.

"International Application Serial No. PCT/IB2017/050772, Written Opinion dated Apr. 7, 2017", 6 pgs.

U.S. Appl. No. 15/098,899, filed Apr. 14, 2016, Mobile Security Offloader.

"Chinese Application Serial No. 201780010718.0, Voluntary Amendment filed Jun. 6, 2019", w/English Claims, 8 pgs.

* cited by examiner

MOBILE SECURITY OFFLOADER

PRIORITY

This application is a continuation of U.S. patent application Ser. No. 15/098,899, filed on Apr. 14, 2016, which claims the benefit of U.S. Provisional Patent Application Ser. No. 62/294,482 filed Feb. 12, 2016, the benefit of priority of each of which is claimed hereby, and each of which are incorporated by reference herein in its entirety.

TECHNICAL FIELD

The present disclosure generally relates to mobile radio networking. More specifically, the present disclosure describes offloading mobile security.

BACKGROUND

Mobile networks allow devices to connect to external packet switched networks (such as the Internet) as part of the basic service provided within the network as defined by international standard bodies. Example of such international standard bodies include 3rd Generation Partnership Project (3GPP) for Global System for Mobile Communications (GSM)/Universal Mobile Telecommunication System (UMTS)/Long-Term Evolution (LTE) domains, Time Division Multiple Access (TDMA)/Code Division Multiple Access (CDMA)/CDMA2000 networks, and newer Low Power Wide Area Networks (LPWAN) initiatives such as LoRa and SIGFOX.

In such systems, the packet data coming to and from a mobile device is transmitted via the radio network to elements such as a base transceiver station (BTS) in a 2G network, a NodeB in a 3G network or an eNodeB in a 4G network. Thereafter, the packet data is sent using tunnels towards a serving general packet radio service (GPRS) support node (SGSN) in a 2G/3G network or the serving gateway (SGW) in a 4G network or similar device in other mobile network solutions.

GPRS Tunnelling Protocol (GTP) tunnels from all mobile devices are aggregated towards a gateway GPRS support node (GGSN) in a 2G/3G network or the PDN gateway (PGW) in a 4G network or similar device in other mobile network solutions. These devices then merge many Ethernet connections containing numerous tunnels in each connection.

It is then the responsibility of the GGSN or PGW to disperse the aggregated GTP tunnels' traffic into multiple data streams and route every single stream into its designated destination on the external packet switched network as initially designated by the mobile device.

With the surge in the field of the Internet of Things (IoT), many more different types of mobile devices are in use than ever before, and this trend only looks to grow as more and more types of devices, such as cars, smart city sensors, shipping containers, baby strollers, etc. adopt mobile communication components.

With the plethora of different types of mobile devices, the threat to security of communications and data increases. While certainly a mobile phone designer may be an expert on communications security, a baby stroller designer may not be. This makes it less likely that mobile communications components embedded into such disparate products will address common security concerns.

Moreover, IoT devices are typically designed to be cheap and battery-conserving. Running security features on IoT devices requires a more complex CPU design and more power consumption, and thus may be inconsistent with these goals.

While most mobile networks themselves are secure, the Internet is a less secure medium so when the communications leave the mobile network and enter the Internet the threat to security rises.

BRIEF DESCRIPTION OF DRAWINGS

Some embodiments are illustrated by way of example and not limitation in the figures of the accompanying drawings, in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a security methods and processes are offloaded from a mobile device to a mobile security offloader component designed to perform all security methods and encryption to protect communications sent from a mobile device via a radio network when the communications are sent to a packet switched network, such as the Internet.

Figure 1:
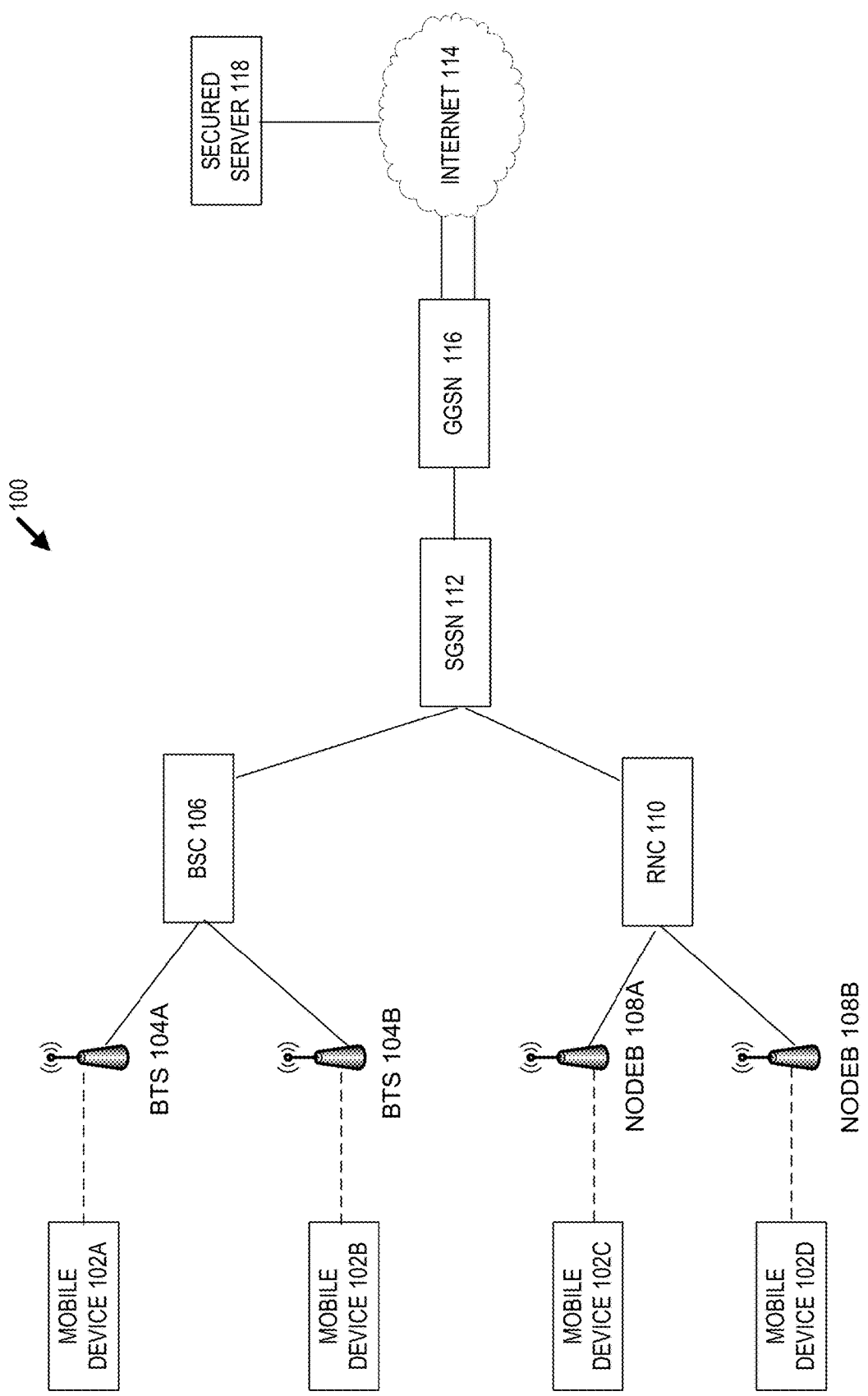
FIG. 1 is a block diagram illustrating a system, in accordance with an example embodiment, for routing network communications in a GSM (2G) and/or UMTS (3G) mobile networks.

FIG. 1 is a block diagram illustrating a system 100, in accordance with an example embodiment, for routing network communications in a GSM (2G) and/or UMTS (3G) mobile networks. The system 100 includes one or more mobile devices 102A-102D. Each mobile device 102A-102D may be any type of device having a radio communicator, commonly known as a cell transceiver. The mobile devices 102A-102D include, for example, smartphones, tablet computers, connected automobiles, sensors, alarm systems, etc.

Each mobile device 102A-102D connects to a mobile network via radio communications. In FIG. 1, two separate example types of mobile networks are depicted. The first is a GSM-based mobile network. In GSM-based mobile networks, mobile devices 102A, 102B connect via radio communication with a base transceiver station (BTS) 104A, 104B. The BTSs 104A, 104B are terminating nodes for the radio interface. Each BTS 104A, 104B includes one or more transceivers and is responsible for ciphering of the radio interface.

Each BTS 104 is then in communication with a base station controller (BSC) 106. Typically, a BSC 106 has hundreds of BTSs 104A, 104B under its control. The BSC 106 acts to allocate radio resources to the mobile devices 102A, 102B, administer frequencies, and control handovers between BTSs 104. The BSC 106 can also act as a concentrator, so that many low capacity connections to the BSC 106 become reduced to a smaller number of connections.

The second type of mobile network depicted here is a Universal Mobile Telecommunications System UMTS-based mobile network. A UMTS-based mobile network uses wideband code division multiple access (W-CDMA) radio access technology. Here, mobile devices 102C-102D connect via radio communication with a NodeB 108A, 108B. The NodeBs 108A, 108B are terminating nodes for the radio interface. Each NodeB 108A, 108B includes one or more transceivers and is responsible for ciphering of the radio interface. Each NodeB 108A-108B is configured to apply codes to describe channels in a CDMA-based UMTS network. Generally, each NodeB 108A-108B performs similar functions for the UMTS network that the BTS 104A-104B performs for the GSM network.

Each NodeB 108A-108B is then in communication with a radio network controller (RNC) 110. Typically, an RNC 110 has hundreds of NodeBs 108A, 108B under its control. The RNC 110 acts to allocate radio resources to the mobile devices 102C, 102D, administer frequencies, and control handovers between NodeBs 108A-108B. The RNC 110 can also act as a concentrator, so that many low capacity connections to the RNC 110 become reduced to a smaller number of connections.

It should be noted that while two different mobile network types are depicted here, the concepts described in this disclosure will work in systems having only a single network type, as well as in systems having multiple network types, either in addition to or in lieu of the network types depicted in FIG. 1.

The BTSs 104A, 104B and/or the NodeBs 108A, 108B connect to a serving GPRS support node (SGSN) 112, which handles all packet switched data within the network. There are actually two forms of GPRS support nodes (GSNs) in a typical system 100. Of relevance here is the first type: the SSGN, which is typically responsible for the delivery of data packets to and from the BTSs 104A, 104B and NodeBs 108A, 108B within its geographical service area. Additional tasks may include packet routing and transfer, mobility management (attaching/detaching and mobility management), logical link management, and charging functions.

In some example embodiments, the functions described above with respect to an SGSN 112 are performed by a serving gateway (SGW), which for simplicity is not depicted here. In some other example embodiments, some other type of device may perform the functions described above with respect to the SGSN 112. All of these types of devices, including SGSNs 112 and SGWs, may be collectively termed "aggregators" or "packet aggregators."

Data packets are sent upstream from a mobile device 102A-102D towards an external packet switched data network such as the Internet 114. The SGSN 112 aggregates the data packets from the mobile devices 102A-102D and sends them to a gateway GPRS support node (GGSN) 116, which is the second type of GSN. The GGSN 116 is responsible for the internetworking between the GPRS network and the external packet switched networks, such as the Internet 114. From an external network's point of view, the GGSN 116 is a router to a sub-network, because the GGSN 116 hides the GPRS infrastructure from the external network. When the GGSN 116 receives data addressed to a specific user, it checks if the user is active. If it is, the GGSN 116 forwards the data to the SGSN 112 serving the mobile user. If the mobile user is inactive, the data is discarded. The GGSN 116 is the anchor point that enables the mobility of the user terminal in the GPRS network.

In order to secure data being transmitted through this system 100, a mobile device 102A-12D might encrypt the data using methods such as Secure Sockets Layer (SSL), Transport Layer Security (TLS), virtual private network (VPN), or the like. This encryption is then maintained through all the components in the network, including the BTS 104A, 104B or NodeB 108A, 108B, BSC 106 or RNC 110, SGSN 112, GGS 116, and ultimately through the Internet 114 to the secured server 118. This, however, increases the cost and power utilization of the mobile device 102A-102D, as the mobile device 102A-102D has to be programmed/designed with encryption mechanisms. Additionally, an internal firewall needs to be maintained in order for the mobile device 102A-102D to be protected from malicious devices on the Internet 114.

Figure 2:
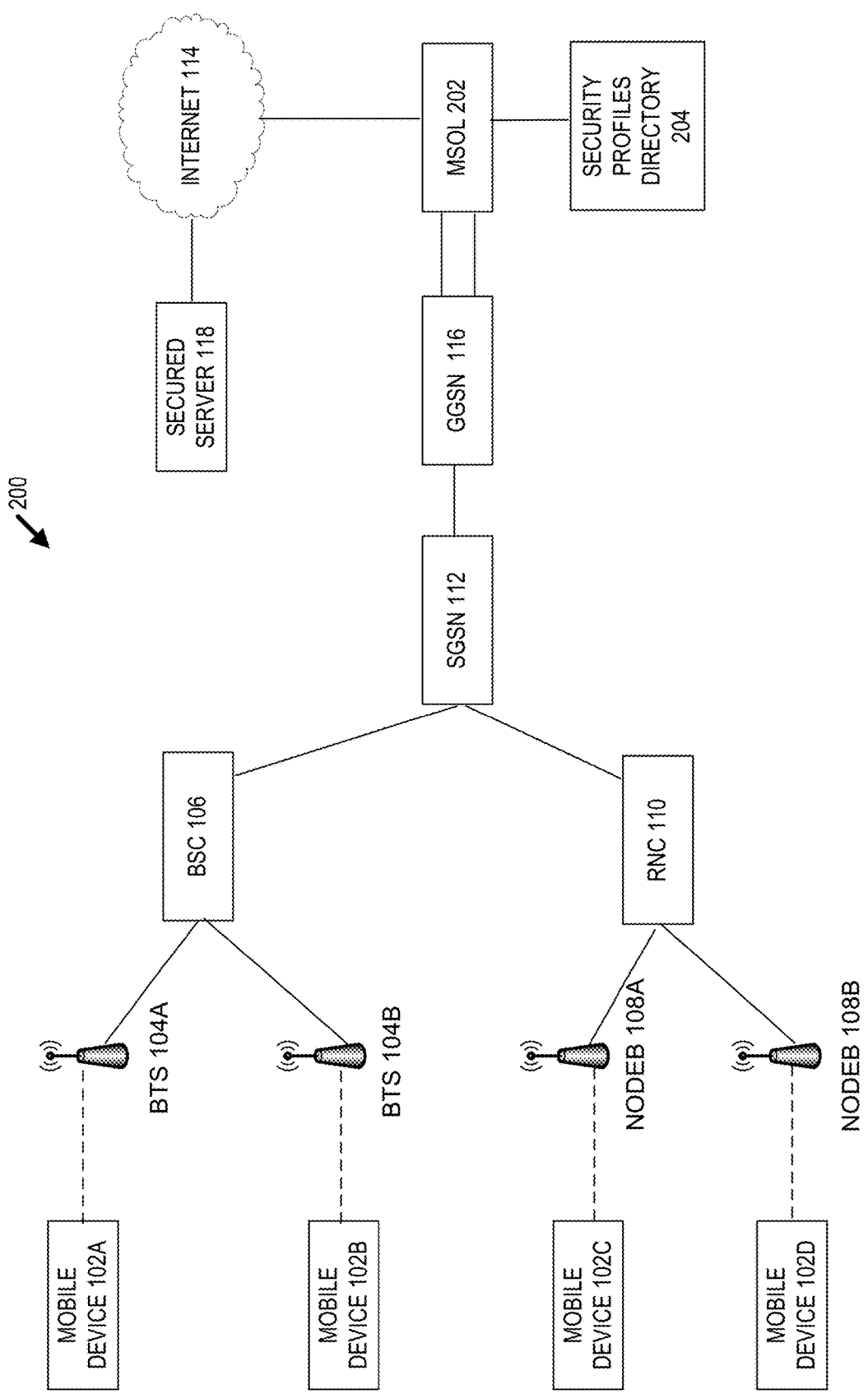
FIG. 2 is a block diagram illustrating a system, in accordance with an example embodiment, for routing network communications in a GSM (2G) and/or UMTS (3G) mobile networks.

FIG. 2 is a block diagram illustrating a system 200, in accordance with an example embodiment, for routing network communications in GSM (2G) and/or UMTS (3G) mobile networks. The various components in FIG. 2 are similar to that of FIG. 1, except for the addition of a mobile security offloader (MSOL) 202 and a corresponding security profiles directory 204. In FIG. 2, no security encryption is performed on the mobile device 102A-102D itself, but rather the mobile device 102A-102D sends unencrypted traffic through the mobile network towards the MSOL 202, relying on the security protocols of the mobile network provider to protect this traffic. The MSOL 202 then retrieves a security profile corresponding to the sending mobile device 102A-102D from a security profiles directory 204. The sending mobile device 102A-102D may be identified based on a subscriber identity module (SIM) or Universal Integrated Circuit Card (UICC) card identifier, such as International Mobile Subscriber Identity (IMSI) or Mobile Station International Subscriber Directory Number (MSISDN). Based on the corresponding security profile, the MSOL 202 knows how to encrypt the traffic and pass it in encrypted form to the secured server 118. Encryption may be performed on the MSOL 202 using methods such as SSL, TLS, VPN, and the like, removing the need to handle security and encryption on the mobile device 102A-102D itself. In some example embodiments, the MSOL 202 may also provide an external firewall for the mobile device 102A-102D based on the stored security profile.

Figure 3:
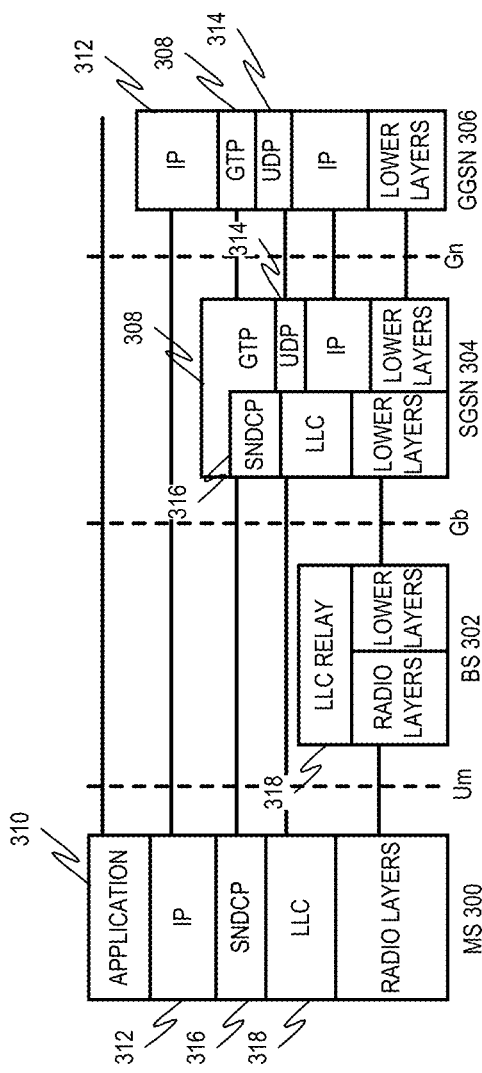
FIG. 3 is a block diagram illustrating protocol stacks for GPRS sub-network services, in accordance with an example embodiment.

FIG. 3 is a block diagram illustrating protocol stacks for GPRS sub-network services, in accordance with an example embodiment. Depicted here are a mobile device (MS) 300, base station (BS) 302, SGSN 304, and GGSN 306. GTP 308 is the protocol used between the SGSN 304 and GGSN 306 using the Gn interface. This is a layer 3 tunnelling protocol. The process that takes place appears like a normal IP sub-network for users inside and outside the network. An application 310 communicates via IP 312, which is carried through the GPRS network and out through the GGSN 306. The packets that are moving between the GGSN 306 and the SGSN 304 use GTP 308. This way the IP addresses located on the external side of the GPRS do not have to deal with the internal backbone. On the SGSN 304, UDP 314 and IP 312 are run by GTP 308.

SubNetwork Dependent Convergence Protocol (SNDCP) 316 and Logical Link Control (LLC) 318 are used in combination between the SGSN 304 and the MS 300. SNDCP 316 is the top-most layer of the user plane GPRS protocol stack. The SNDCP 316 flattens data to reduce the load on the radio channel. The main purpose of SNDCP 316 is to buffer and segment network protocol data unit (PDUs), add headers to each segment, and then give the segment to LLC 318 for transmission. A safe logical link created by encrypting packets is provided by LLC 318 and the same LLC 318 link is used as long as a mobile is under a single SGSN 304. SNDCP 316 also performs compression and decompression. The idea is to reduce the amount of data that is required to be sent over the air As such, SNDCP 316 is often aware of certain details about the packet-data network (PDN) protocol for compression-related functions. The SNDCP 316 may also be aware of PDP contexts and corresponding information such as PDP type, QoS, etc. This information is given during a PDP context activation procedures.

The function of the LLC 318 is to manage and ensure the integrity of data transmissions. The LLC 318 provides data link layer links to services for the network layer protocols. This is accomplished by LLC service access points for the services residing on network computers. Additionally, there is an LLC control field for delivery requests or services. The LLC 318 may also perform ciphering and deciphering of packets.

Figure 4:
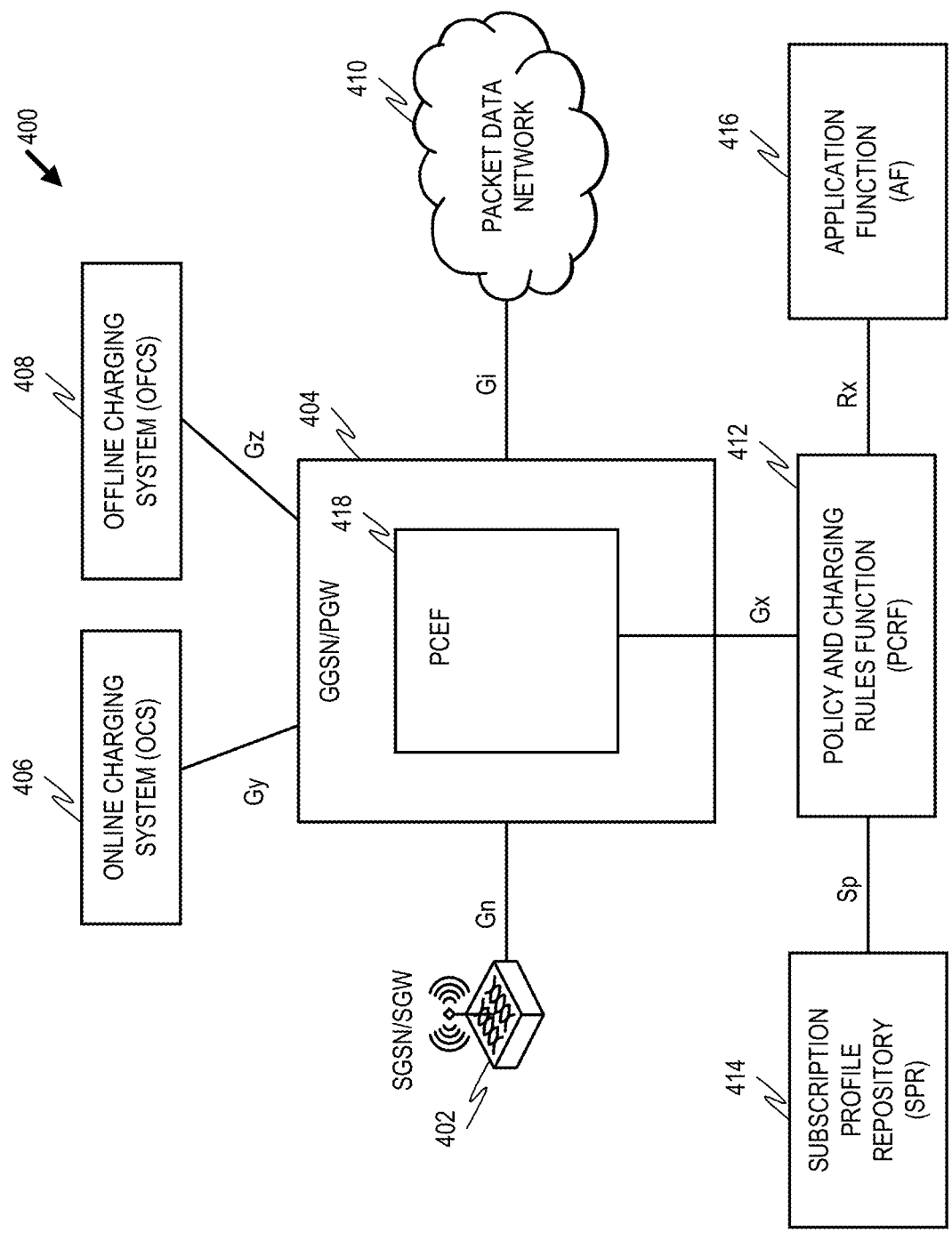
FIG. 4 is a block diagram illustrating a system including an SGSN/SGW and a GGSN/PDN Gateway (PGW).

FIG. 4 is a block diagram illustrating a system 400 including an SGSN/SGW 402 and a GGSN/PDN Gateway (PGW) 404. In an example embodiment, the SGSN/SGW 402 may be the SGSN 112 of FIG. 1 and the GGSN/PGW 404 may be the GGSN 116 of FIG. 1. The SGSN/SGW 402 transfers data from the mobile radio network to the GGSN/PGW 404 via a Gn interface port. The Gn is comprised of GPRS Tunnelling Protocol (GTP) tunnels. GTP 308 is divided into GTP-C, which controls the tunnels, and GTP-U, which is the actual user traffic data.

An online charging system (OCS) 406 connects to the GGSN/PGW 404 via a Gy reference point. The OCS 406 is a billing system that tells the GGSN/PGW 404 if a certain tunnel has a quota on bandwidth, and also to allow or disallow tunnels based on the actual service plan and account balance per user. Online charging has two sub-functions: rating and unit determination. Both of them can be implemented as centralized or decentralized.

Rating refers to calculation of pieces of the non-monetary units calculated by the unit determination function. Unit determination refers to the calculation of the number of non-monetary units (service units, data volume, time and events) that shall be assigned prior to starting service delivery.

Three cases for online charging can be distinguished: immediate event charging (IEC), event charging with unit reservation (ECUR), and session charging with unit reservation (SCUR).

IEC involves a direct debit operation, where a financial account is immediately debited for an appropriate charge. In ECUR, the financial units are reserved prior to service delivery, and a financial account debit operation is carried out following the conclusion of service delivery. In SCUR, the financial units are reserved prior to session supervision, and a financial account debit operation is carried out following the conclusion of session termination.

An offline charging system (OFCS) 408 connects to the GGSN/PGW 404 via the Gz reference point. The OFCS 408 is a billing system for post-paid call detail record (CDR) processing. Offline charging is a process where charging information for network resource usage is collected concurrently with that resource usage. The charging information is then passed through a chain of logical charging functions. At the end of this process, CDR files are generated by the network, which are then transferred to the network operator's billing domain for the purpose of subscriber billing and/or interoperator accounting (or additional functions such as statistics). The billing domain typically includes post-processing systems such as the operator's billing system or billing mediation device.

Examples of offline charging functions include charging trigger function (CTF), charging data function (CDF), and charging gateway function (CGF). The CTF generates charging events based on the observation of network resource usage. The CTF is the focal point for collecting the information pertaining to chargeable events within the network element, assembling this information into matching charging events, and sending these charging events towards the CDF. The CTF is made up of two functional blocks: account metrics collection, which monitors signalling functions for calls service events or sessions established by the network users, or the handling of user traffic for those calls, service events or sessions, or service delivery to the user via these calls, service events or sessions, and accounting data forwarding, which receives the collected accounting metrics and determines the occurrence of chargeable events from a set of one or more of the metrics and then assembles charging events that match the detected chargeable events, and forwards the charging events towards the charging data function via an Rf interface.

The CDF receives charging events from the CTF via the Rf reference point. It then uses the information contained in the charging events to construct CDRs. The CDRs produced by CDF are transferred immediately to the charging gateway function (CGF) via the Ga interface point. The CGF performs functions such as CDR reception from the CDF via Ga interface in near real-time, CDR pre-processing, validation, consolidation and (re)formatting of CDRs, CDR error handling, persistent CDR storage, CDR routing and filtering, CDR file management, and CDR file transfer to the billing domain The packet data network 410 connects to the GGSN/PGW 404 via the Gi reference point. The packet data network 410 is a public or private data network to which mobile devices 300 can send data. A policy and charging rules function (PCRF) 412 connects to the GGSN/PGW 404 via the Gx reference point and is part of a method to enforce data flow policies in the GGSN/PGW 404. The PCRF 412 is in charge of collecting the rules and passing them to the GGSN/PGW 404. The PCRF 412 provides network control regarding service data flow detection, gating (blocking or allowing packets), QoS control, and charging. The PCRF 412 may, for example, reject a request received from an application 310 when the service information is not consistent with subscription information.

The PCRF 412 connects to a subscription profile repository (SPR) 414 via the Sp reference point. The SPR 414 contains subscriber and subscription information, typically stored on a per-PDN basis, and would include information such as the subscriber's allowed services, information on the subscriber's allowed QoS, the subscriber's charging related information, and a subscriber category. The PCRF 412 can access the SPR 414 to query profiles for each relevant user. An application function (AF) 416 connects to the PCRF 412 via the Rx reference point and allows external application logic to change PCRF rules.

The GGSN/PGW 404 uses a policy enforcement rules function (PCEF) 418 to enforce the rules made by the PCRF 412. While the GGSN/PGW 404 allows basic routing functionality as well as the establishment of VPN, network address translation (NAT), and basic firewall, all of these services are based on the network operator configuration, and none of this functionality is exported to be modified by the actual bearers of the service (mobile devices 300 and their owners, as well as corporations or other organizations employing the owners, collectively known as customers). They are also directed towards connecting internal and external network elements and not specific packet traffic from the mobile devices 300. The PCRF 412 also enforces security rules using a blacklist (e.g., list of banned mobile devices 300, network locations, traffic types, etc.).

Figure 5:
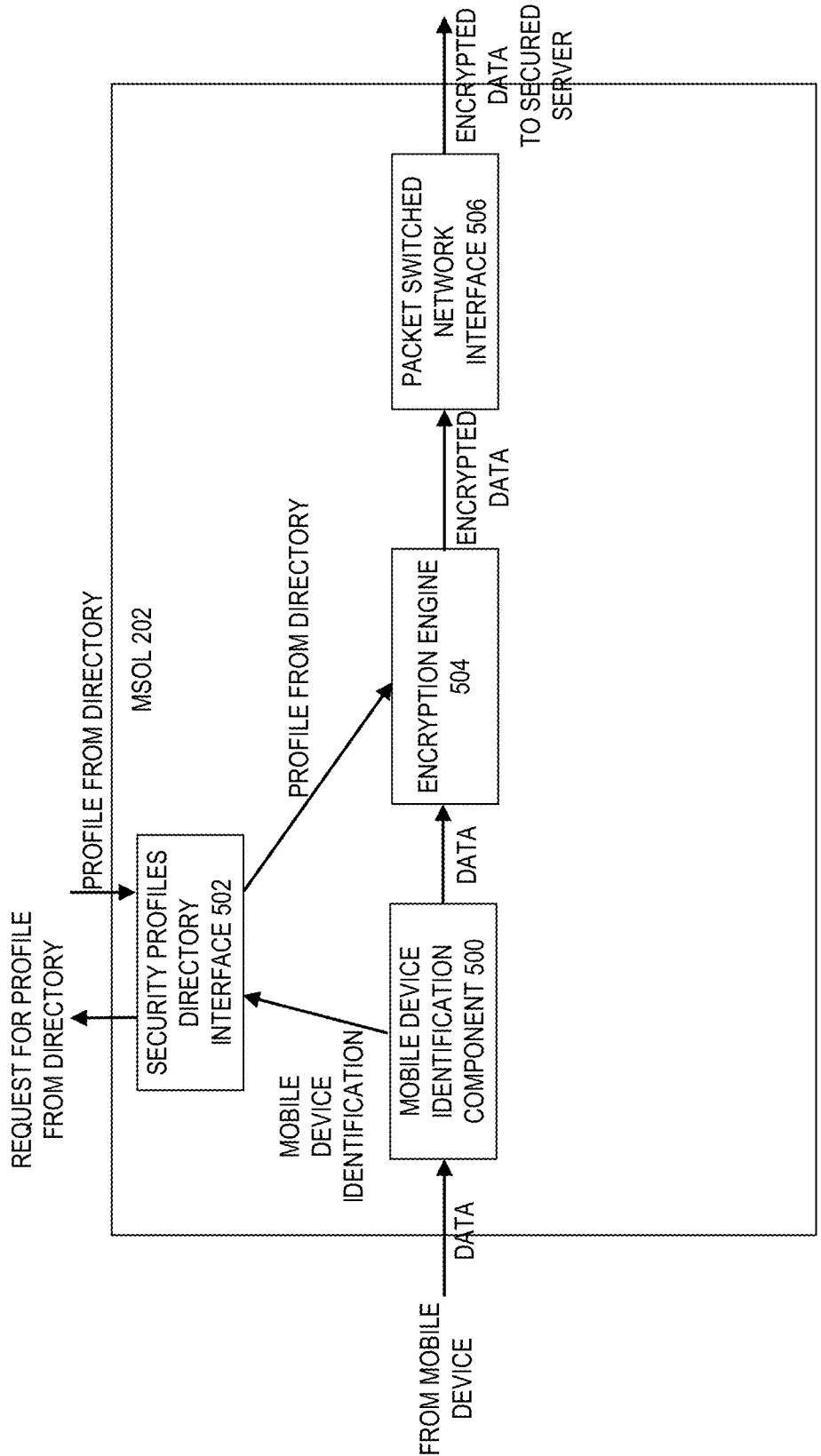
FIG. 5 is a block diagram illustrating a MSOL in more detail in accordance with an example embodiment.

FIG. 5 is a block diagram illustrating a MSOL 202 in more detail, in accordance with an example embodiment. The MSOL 202 may contain a mobile device identification component 500, which acts to identify a mobile device 300 that has sent data to the MSOL 202. The data may comprise any number of different types of communication, including HTTP requests, TCP packets, voice calls, SMS messages, and the like. The mobile device identification component 500 may determine which mobile device 300 sent the data based, at least in part, on the data itself. For example, the data may include a field identifying an IMSI or similar unique identification of the mobile device 300. Alternatively, in the cases of voice calls, metadata accompanying the voice call may include unique identification information, such as a phone number via a caller ID mechanism. No matter the form of the identification of the mobile device 300, the mobile device identification component 500 may forward this identification to a security profiles directory interface 502, which may act to form a request for a profile corresponding to the mobile device identification from a security profiles directory 204.

The corresponding profile is then returned to the security profiles directory interface 502 from the security profiles directory 204. The profile is then sent to an encryption engine 504, which acts to encrypt the data using information from the profile. The format of the profile may vary greatly depending upon implementation and based upon the encryption scheme used for transmission to the secured server 118. In some example embodiments, each mobile device identification has a corresponding individual security profile, even though, in some instances, the information in a particular individual security profile may exactly match information in another individual security profile (such as where two individuals use the exact same parameters for security encryption). In that case, the security profile may list the particular mobile device identification to which it applies in a field of the security profile, which can be searched by the security profile directory 204 to obtain the security profile when needed. In other example embodiments, a corresponding security profile may be shared among multiple mobile device identifications. In that case, the security profile may specify a grouping or range of identifications to which the security profile applies, which can be searched by the security profile directory 204 to obtain the security profiles when needed.

In should be noted that in some example embodiments a mobile operator and/or end subscriber can modify the profile directory, via one or more different types of interface, such as a command line interface, web interface, or API.

The encryption engine 504 may be a software component, a hardware component, or some variation thereof. Certain types of encryption may be more beneficial to implement in hardware than in software. In some example embodiments, the encryption engine 504 is designed to handle multiple different types of encryption based on the information in the security profile.

In its simplest form, a security profile may identify an encryption standard to use to encrypt data from the mobile device 102 to the secured server 118. For example, the security profile may identify that HTTPS, TLS, VPN, or Secure Real-Time Transport Protocol (SRTP) encryption should be used to encrypt data from the mobile device 102 to the secured server 118. In some instances, however, the security profile may contain additional details about how to encrypt the data, such as credentials information (e.g., certificates, user names, passwords, etc.), security parameters (e.g., level of encryption, subformat, etc.), and other connection parameters.

An example of an HTTPS profile may include a name for the profile, a mobile device identification to which the profile pertains, various HTTPS security fields (e.g., checklist of security checks to be performed), and various HTTPS parameter fields (e.g., remote logging).

An example of a TLS profile may include a name for the profile, a mobile device identification to which the profile pertains, various TLS security fields (e.g., minimum protocol method, ciphers, certificate authentication), and various TLS parameter fields (e.g., nonce validity time, transport type).

An example of a VPN profile may include a name for the profile, a description of the profile, a mobile device identification to which the profile pertains, various VPN security fields (e.g., client authentication method, enable password persistence), and various VPN parameter fields identifying connection parameters (e.g., enable auto network detection, maximum transmission unit size, amount of time to wait before indicating a failure to connect, enable host ID check).

When a response is received from the secured server 118, the encryption engine 504 may act to decrypt the response into a decrypted format using the same security profile. This decrypted response may then be forwarded to the mobile device 300. In practice, the MSOL 202 may be receiving many pieces of data from many different mobile devices 300 as well as from many different secured servers 118. As such, in some example embodiments, a cache (not pictured) may be maintained on the MSOL 202 for storing the retrieved security profiles. This cache may be purged based on a temporal schedule (e.g., how long the profile has been maintained in the cache) or on a session schedule (e.g., a security profile is maintained in the cache for as long as a session is maintained between a corresponding mobile device 300 and a secured server 118).

Figure 6:
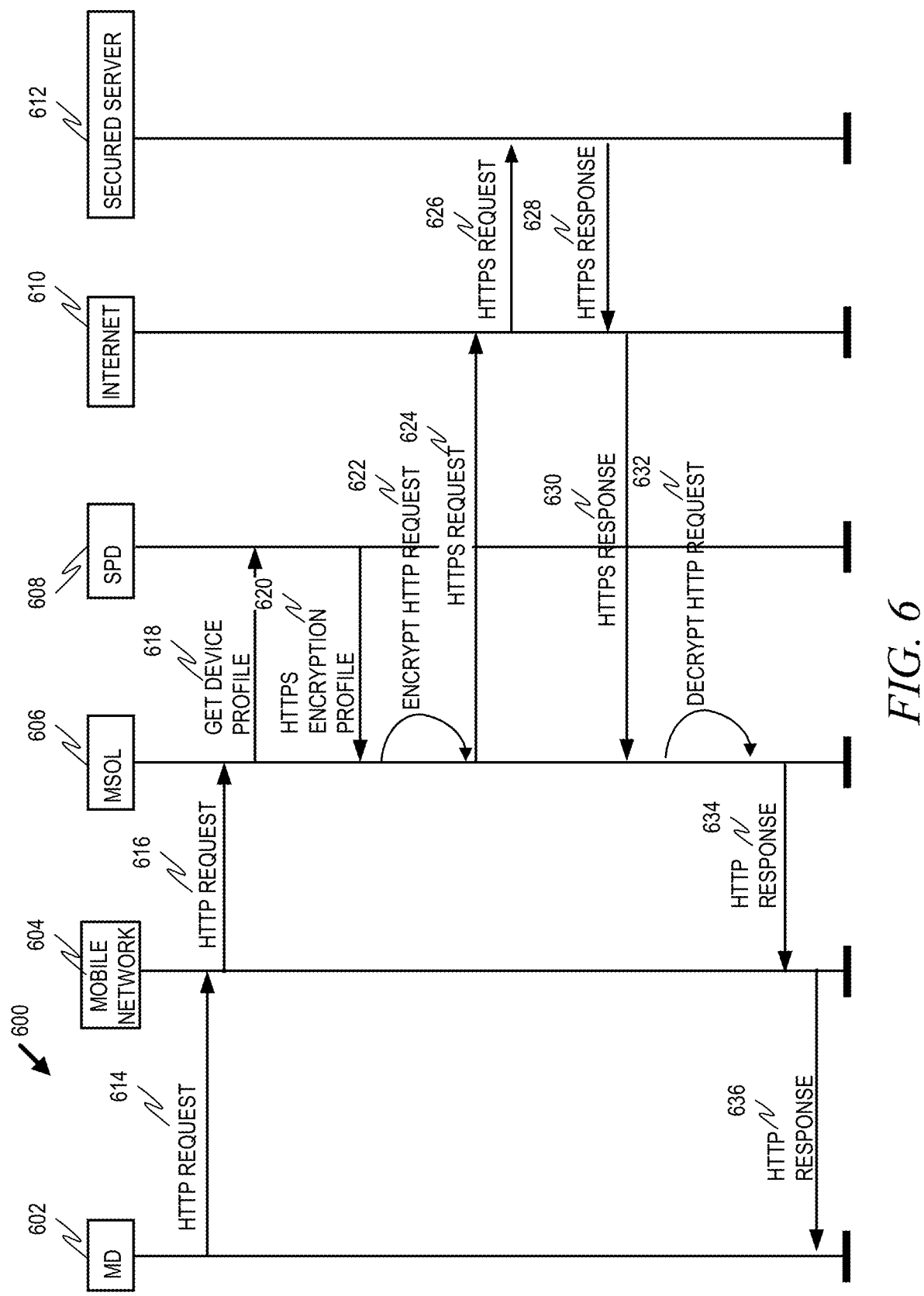
FIG. 6 is an interaction diagram illustrating a method of performing hypertext transfer protocol secure (HTTPS) encryption on mobile device packets in accordance with an example embodiment.

FIG. 6 is an interaction diagram illustrating a method 600 of performing hypertext transfer protocol secure (HTTPS) encryption on mobile device packets in accordance with an example embodiment. This method 600 utilizes a mobile device (MD) 602, a mobile network 604 to which the MD 602 is connected, a MSOL 606, a security profile directory (SPD) 608, the Internet 610, and a secured server 612. At operation 614, an HTTP request is sent from the mobile device 602 through the mobile network 604, which at operation 616 is forwarded to the MSOL 606. At operation 618, the MSOL 606 requests a device profile from the SPD 608. This may include identifying a unique identifier of the MD 602 such as an IMSI and forwarding it to the SPD 608. The SPD 608 then returns an HTTPS encryption profile at operation 620. The HTTPS encryption profile may be one that corresponds to the MD 602 as identified by the unique identifier such as the IMSI. At operation 622, the MSOL 606 uses this HTTPS encryption profile to encrypt the HTTP request, forming an HTTPS request. At operation 624 the MSOL 606 sends this HTTPS request to the Internet 610 towards secure server 612, which receives it at operation 626. The secured server 612 can then perform HTTPS decryption to read the request and act accordingly, forming an HTTP response which it encrypts as an HTTPS response, which is sent at operation 628 and received at the MSOL 606 at operation 630. At operation 632, the MSOL 606 then decrypts the HTTPS response using the device profile, and sends the decrypted HTTP response to the mobile network 604 at operation 634, which forwards it to the MD 602 at operation 636.

Figure 7:
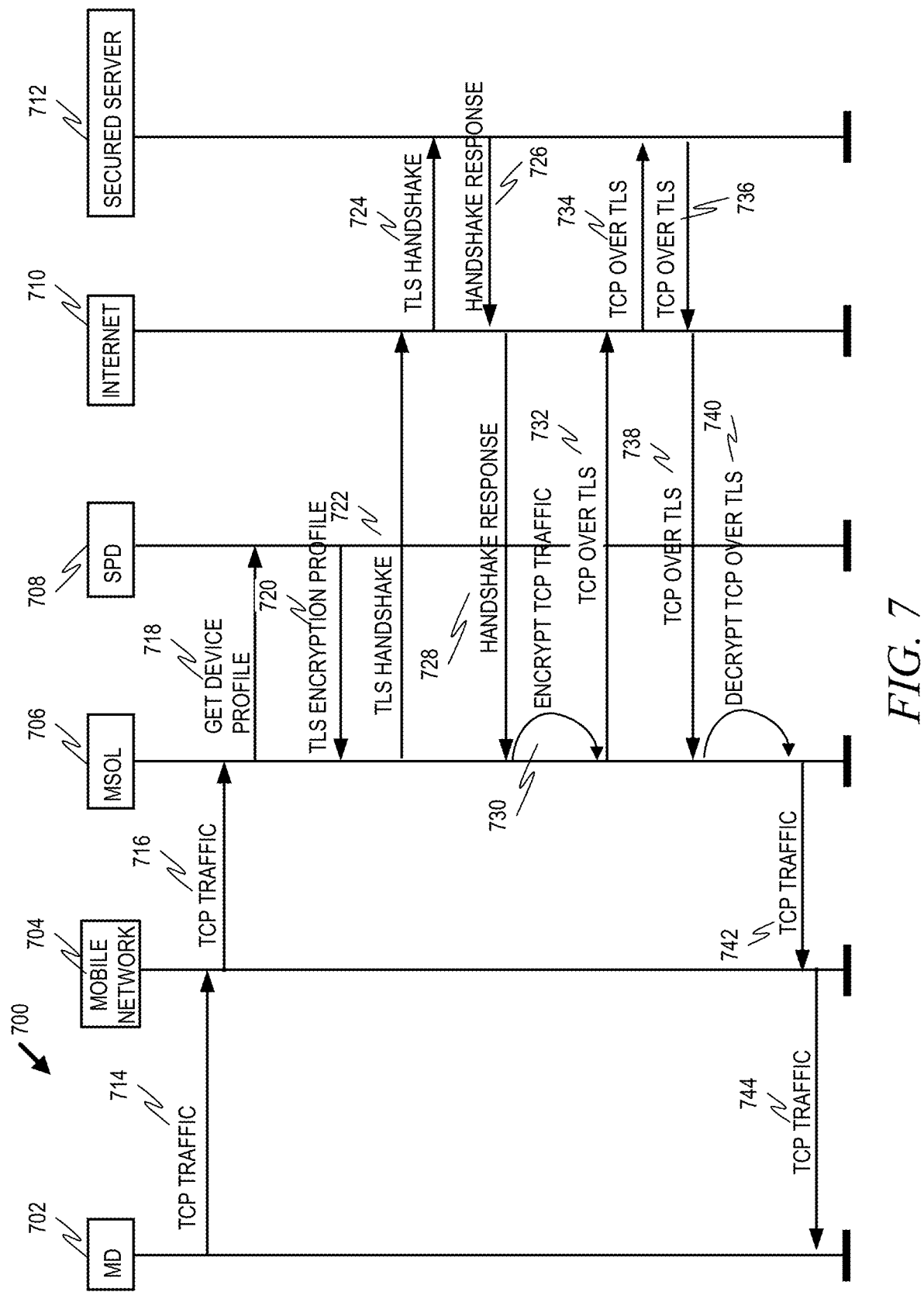
FIG. 7 is an interaction diagram illustrating a method of performing TLS encryption on mobile device packets in accordance with an example embodiment.

FIG. 7 is an interaction diagram illustrating a method 700 of performing TLS encryption on mobile device packets in accordance with an example embodiment. This method 700 utilizes a mobile device (MD) 702, a mobile network 704 to which the MD 702 is connected, a MSOL 706, a security profile directory (SPD) 708, the Internet 710, and a secured server 712. At operation 714, TCP traffic is sent from the mobile device 702 through the mobile network 704, which at operation 716 is forwarded to the MSOL 706. At operation 718, the MSOL 706 requests a device profile from the SPD 708. This may include identifying a unique identifier of the MD 702 such as an IMSI forwarding it to the SPD 708. The SPD 708 then returns a TLS encryption profile at operation 720. The TLS encryption profile may be one that corresponds to the MD 702 as identified by the unique identifier such as the IMSI. At operation 722, the MSOL 706 initiates a TLS handshake with the secured server 712, which is received by the secured server 712 via the Internet 710 at operation 724. At operation 726, the secured server 712 may send a handshake response to the MSOL 706, which is received by the MSOL 706 via the Internet 710 at operation 728.

At operation 730, the MSOL 706 uses the TLS encryption profile to encrypt the TCP traffic, forming TCP over TLS traffic. At operation 732 the MSOL 706 sends this TCP over TLS traffic to the Internet 710 towards secure server 712, which receives it at operation 734. The secured server 712 can then perform TLS decryption to read the traffic and act accordingly, forming response TCS traffic, which it encrypts as TCP over TLS traffic, which is sent at operation 736 and received at the MSOL 706 at operation 738. At operation 740, the MSOL 706 then decrypts the TCP over TLS traffic, and sends the decrypted TCP traffic to the mobile network 704 at operation 742, which forwards it to the MD 702 at operation 744.

Figure 8:
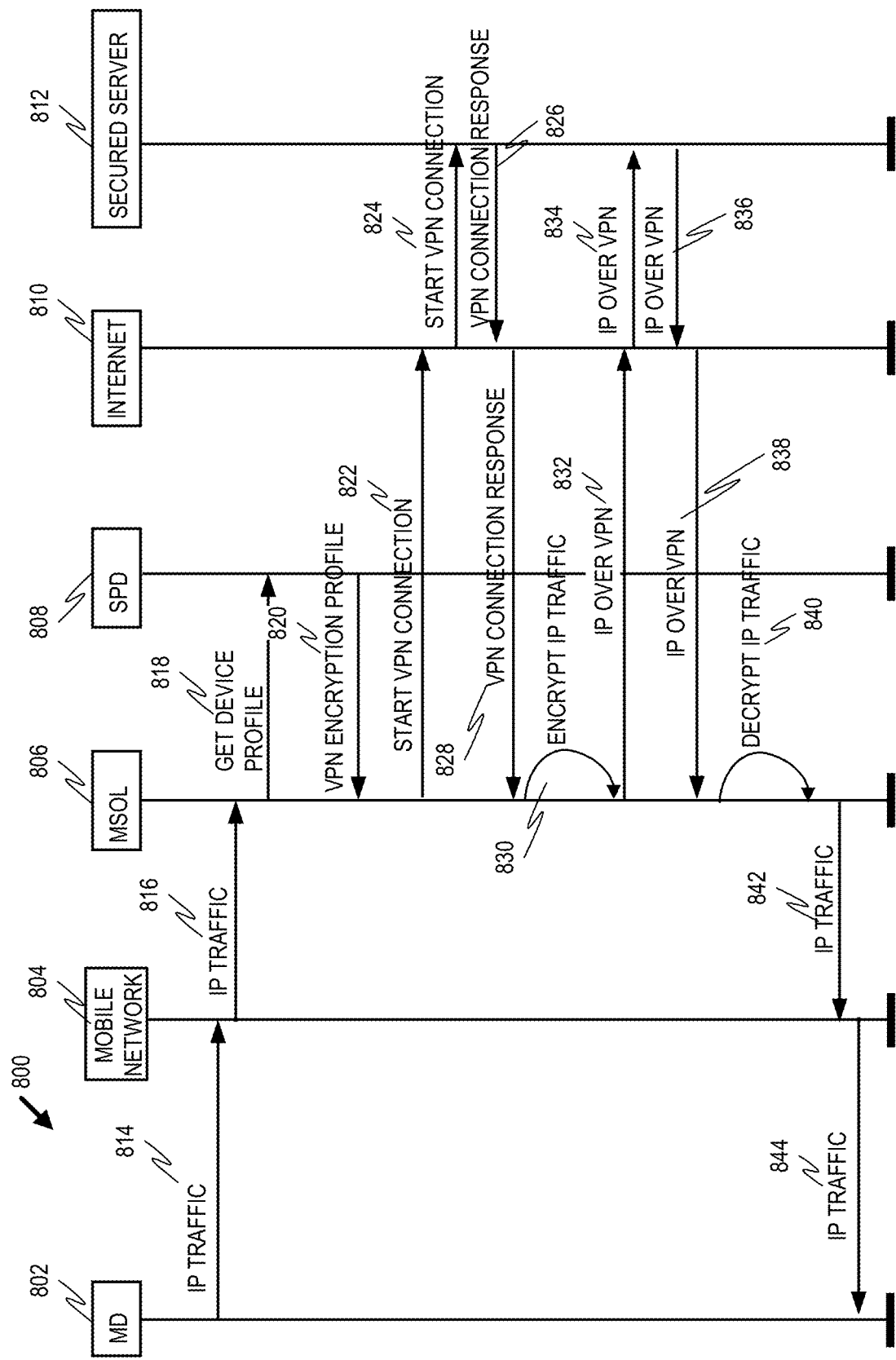
FIG. 8 is an interaction diagram illustrating a method of performing VPN encryption on mobile device packets in accordance with an example embodiment.

FIG. 8 is an interaction diagram illustrating a method 800 of performing VPN encryption such as IPSEC encryption on mobile device packets in accordance with an example embodiment. This method 800 utilizes a mobile device (MD) 802, a mobile network 804 to which the MD 802 is connected, a MSOL 806, a security profile directory (SPD) 808, the Internet 810, and a secured server 812. At operation 814, IP traffic is sent from the mobile device 802 through the mobile network 804 which, at operation 816, is forwarded to the MSOL 806. At operation 818, the MSOL 806 requests a device profile from the SPD 808. This may include identifying a unique identifier of the MD 802 such as an IMSI and forwarding it to the SPD 808. The SPD 808 then returns a VPN encryption profile at operation 820. The VPN encryption profile may one that corresponds to the MD 802 as identified by the unique identifier such as the IMSI. At operation 822, the MSOL 806 initiates the start of a VPN connection with the secured server 812, which is received by the secured server 812 via the Internet 810 at operation 824. At operation 826, the secured server 812 may send a VPN connection response to the MSOL 806, which is received by the MSOL 806 via the Internet 810 at operation 828.

At operation 830, the MSOL 806 uses the VPN encryption profile to encrypt the IP traffic, forming IP over VPN traffic. At operation 832 the MSOL 806 sends this IP over VPN traffic to the Internet 810 towards secure server 812, which receives it at operation 834. The secured server 812 can then perform VPN decryption to read the traffic and act accordingly, forming response IP traffic, which it encrypts as IP over VPN traffic, which is sent at operation 836 and received at the MSOL 806 at operation 838. At operation 840, the MSOL 806 then decrypts the IP over VPN traffic, and sends the decrypted IP traffic to the mobile network 804 at operation 842, which forwards it to the MD 802 at operation 844.

Figure 9:
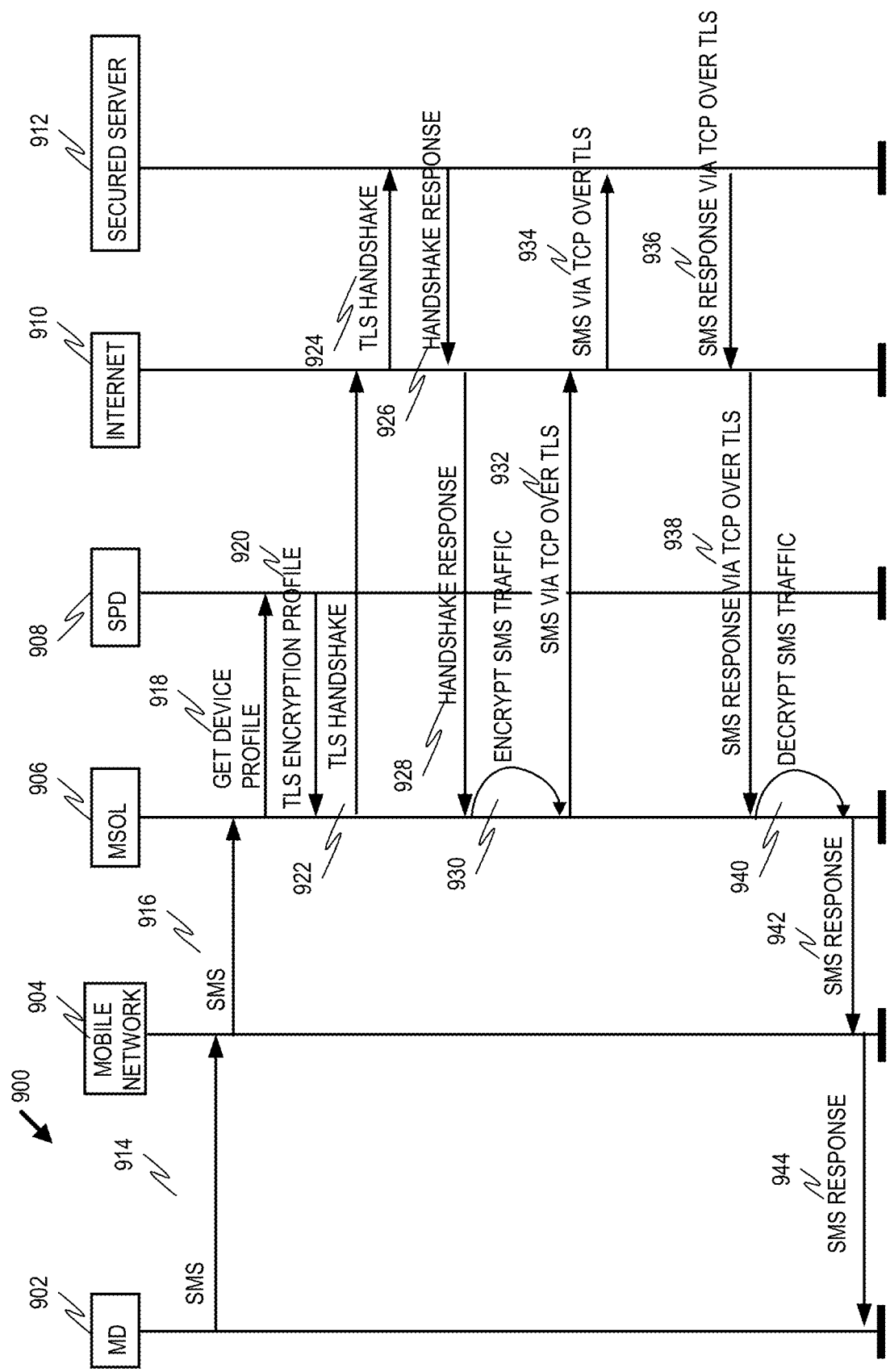
FIG. 9 is an interaction diagram illustrating a method of performing TLS encryption on short messaging service (SMS) packets in accordance with an example embodiment.

FIG. 9 is an interaction diagram illustrating a method 900 of performing TLS encryption on short messaging service (SMS) packets in accordance with an example embodiment. This method 900 utilizes a mobile device (MD) 902, a mobile network 904 to which the MD 902 is connected, a MSOL 906, a security profile directory (SPD) 908, the Internet 910, and a secured server 912. At operation 914, an SMS message is sent from the mobile device 902 through the mobile network 904, which at operation 916 is forwarded to the MSOL 906. This may be performed either via Signalling System 7 (SS7) or Short Message Peer-to-Peer (SMPP) bearer. At operation 918, the MSOL 906 requests a device profile from the SPD 908. This may include identifying a unique identifier of the MD 902, such as an IMSI and forwarding it to the SPD 908. The SPD 908 then returns a TLS encryption profile at operation 920. The TLS encryption profile may one that corresponds to the MD 902 as identified by the unique identifier, such as the IMSI. At operation 922, the MSOL 906 initiates a TLS handshake with the secured server 912, which is received by the secured server 912 via the Internet 910 at operation 924. At operation 926, the secured server 912 may send a TLS handshake response to the MSOL 906, which is received by the MSOL 906 via the Internet 910 at operation 928.

At operation 930, the MSOL 906 uses the TLS encryption profile to encrypt the SMS message, forming SMS via TCP over TLS traffic. At operation 932 the MSOL 906 sends this SMS via TCP over TLS traffic to the Internet 910 towards secure server 912, which receives it at operation 934. The secured server 912 can then perform TLS decryption to read the SMS message and act accordingly, such as by forwarding the SMS message to a recipient and receiving an SMS response from the recipient. Then it can encrypt the SMS response using TLS, forming response SMS via TCP over TLS traffic, which is sent at operation 936 and received at the MSOL 906 at operation 938. At operation 940, the MSOL 906 then decrypts the SMS via TCP over TLS traffic, and sends the decrypted SMS response to the mobile network 904 at operation 942, which forwards it to the MD 902 at operation 944.

Figure 10:
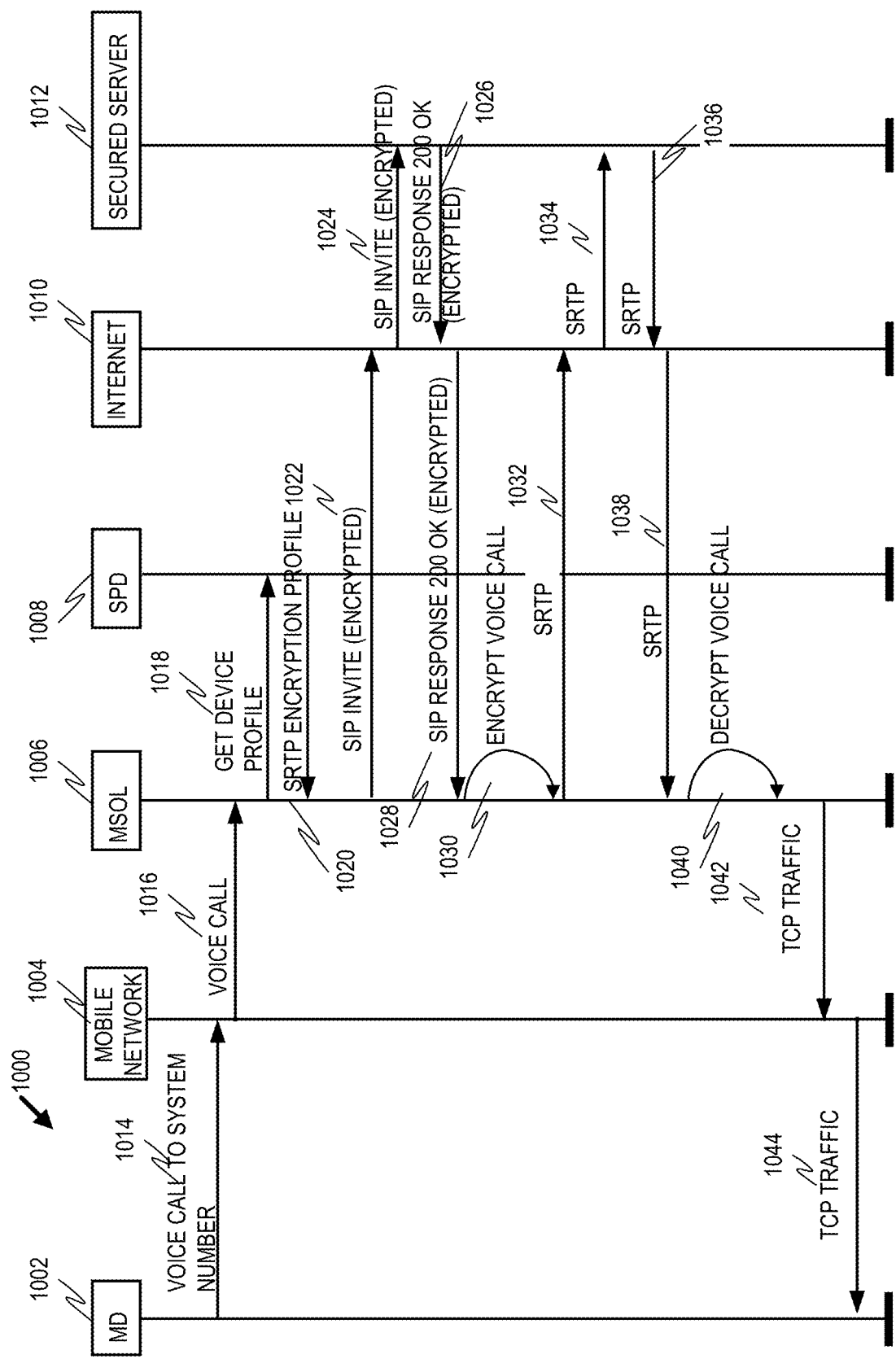
FIG. 10 is an interaction diagram illustrating a method of performing Session Initiation Protocol over TLS (SIPS)/Secure Real-Time Protocol (SRTP) encryption on a voice call in accordance with an example embodiment.

FIG. 10 is an interaction diagram illustrating a method 1000 of performing session initiation protocol over TLS (SIPS)/secure real-time protocol (SRTP) encryption on a voice call, in accordance with an example embodiment. This method 1000 utilizes a mobile device (MD) 1002, a mobile network 1004 to which the MD 1002 is connected, a MSOL 1006, a security profile directory (SPD) 1008, the Internet 1010, and a secured server 1012. At operation 1014, a voice call is initiated to a system number from the mobile device 1002 through the mobile network 1004 which, at operation 1016, is forwarded to the MSOL 1006. At operation 1018, the MSOL 1006 requests a device profile from the SPD 1008. This may include identifying a unique identifier of the MD 1002, such as an IMSI. The SPD 1008 then returns an STRP encryption profile at operation 1020. The STRP encryption profile may one that corresponds to the MD 1002 as identified by the unique identifier such as the IMSI. At operation 1022, the MSOL 1006 initiates an SIP invitation to the secured server 1012, which is received by the secured server 1012 via the Internet 1010 at operation 1024. This SIP invitation may be encrypted. At operation 1026, the secured server 1012 may send a SIP Response 200 OK message to the MSOL 1006, which is received by the MSOL 1006 via the Internet 1010 at operation 1028.

At operation 1030, the MSOL 1006 uses the SRTP encryption profile to encrypt the voice call, forming SRTP traffic. At operation 1032 the MSOL 1006 sends this SRTP traffic to the Internet 1010 towards secure server 1012, which receives it at operation 1034. The secured server 1012 can then perform SRTP decryption to receive the voice call and act accordingly, such as by forwarding the voice call to a recipient and receiving an voice call response from the recipient. Then it can encrypt the voice call response using SRTP, forming response SRTP traffic, which is sent at operation 1036 and received at the MSOL 1006 at operation 1038. At operation 1040, the MSOL 1006 then decrypts the SRTP traffic, and sends the voice call response as TCP traffic to the mobile network 1004 at operation 1042, which forwards it to the MD 1002 at operation 1044.

Mobile devices 1002 may need to sign into a remote server, a cloud service, or other remote services. In order to sign-in, a sign-in process occurs where the device connects to a cloud server and uses a predefined user name or device identification, as well as occasionally a password. This, however, is not terribly secure, as the identification and the password are stored on the device itself, which may be retrieved by a hacker who can use this information to masquerade as the device and hack into the remote server. In an example embodiment, the concept of a "network based trust anchor" is introduced. The network based trust anchor is some feature of the MSOL 1006 that the Secured server 1012 can be sure means that the mobile device 1002 is who it claims to be. In one example embodiment, the mobile device 1002 authenticates to the mobile network using a SIM card. The MSOL 1006 can then perform login for the device or add credentials to the login confirming that it is indeed the actual device. When a mobile device 1002 attempts to perform a login, it sends the request to the MSOL 1006 or the network intercepts the request and routes it to the MSOL 1006. The MSOL 1006 will then identify that the request comes from an actual authenticated mobile device 1002 over the mobile network 1004 and will perform the login, or add additional credentials to the login so the secured server 1012 will have complete positive knowledge that the login came from the device it was supposed to. Such credentials may be pre-shared with the secured server 1012 to strengthen authentication validity.

Figure 11:
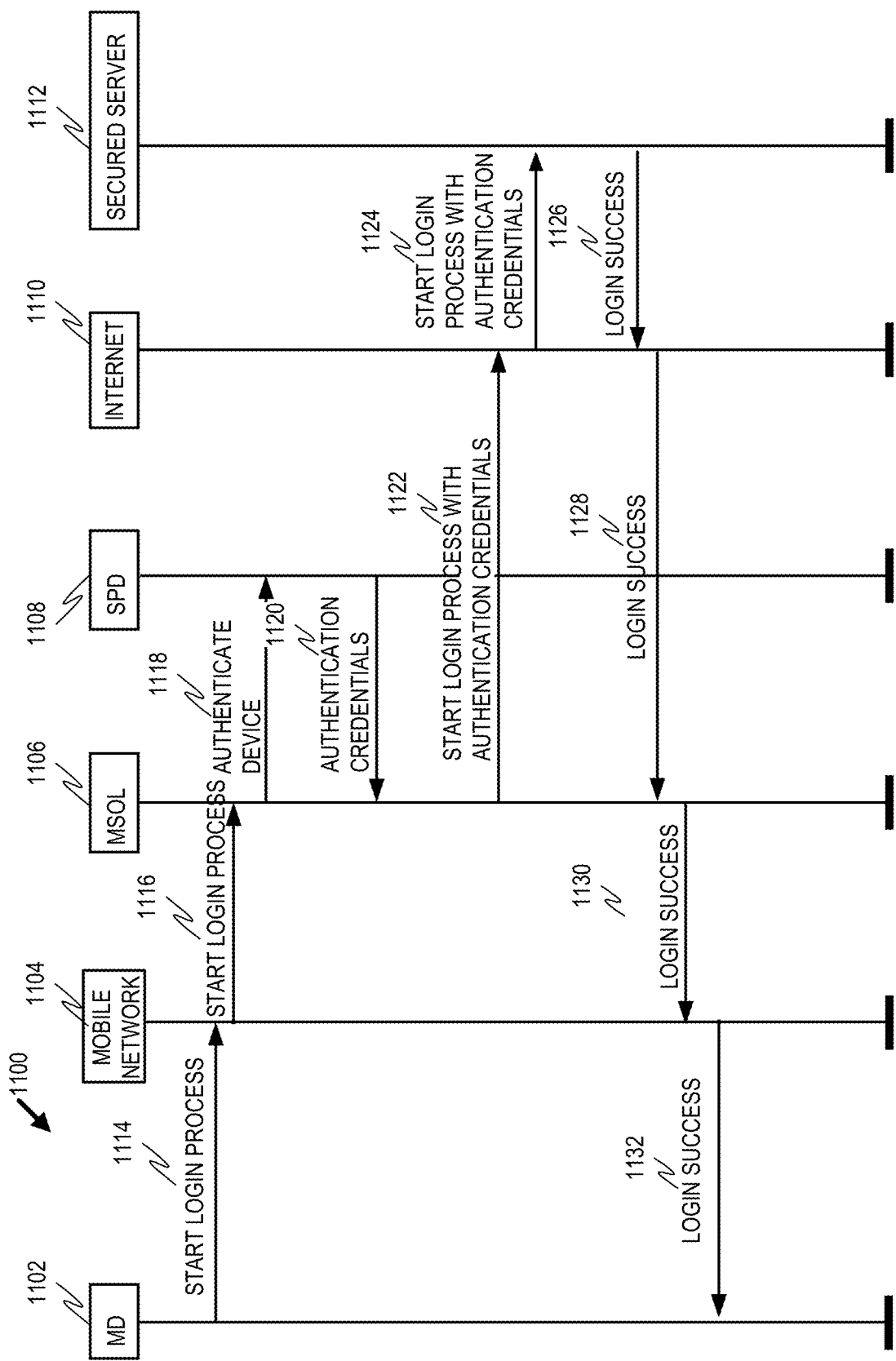
FIG. 11 is an interaction diagram illustrating a MSOL adding network credentials to a login process in accordance with an example embodiment.

FIG. 11 is an interaction diagram illustrating a MSOL adding network credentials to a login process in accordance with an example embodiment. This method 1100 utilizes a mobile device (MD) 1102, a mobile network 1104 to which the MD 1102 is connected, a MSOL 1106, a security profile directory (SPD) 1108, the Internet 1110, and a secured server 1112. At operation 1114, a login process is begun on the MD 1102. At operation 1116, the mobile network 1104 receives this login process start and routes or reroutes it to the MSOL 1106. At operation 1118, the MSOL 1106 authenticates the device by accessing the SPD 1108, which returns authentication credentials at operation 1120. At operation 1122, the login process is then started by this MSOL 1106 with the authentication credentials injected into the login process. At operation 1124, the secured server 1112 receives the login process with authentication credentials and logs in the mobile device 1102 using the authentication credentials. At operation 1126, the secured server 1112 sends a login success message, which is received by the MSOL 1106 at operation 1128. The MSOL 1106 then sends this login success message towards the MD 1102 at operation 1130, which receives it at operation 1132.

Figure 12:
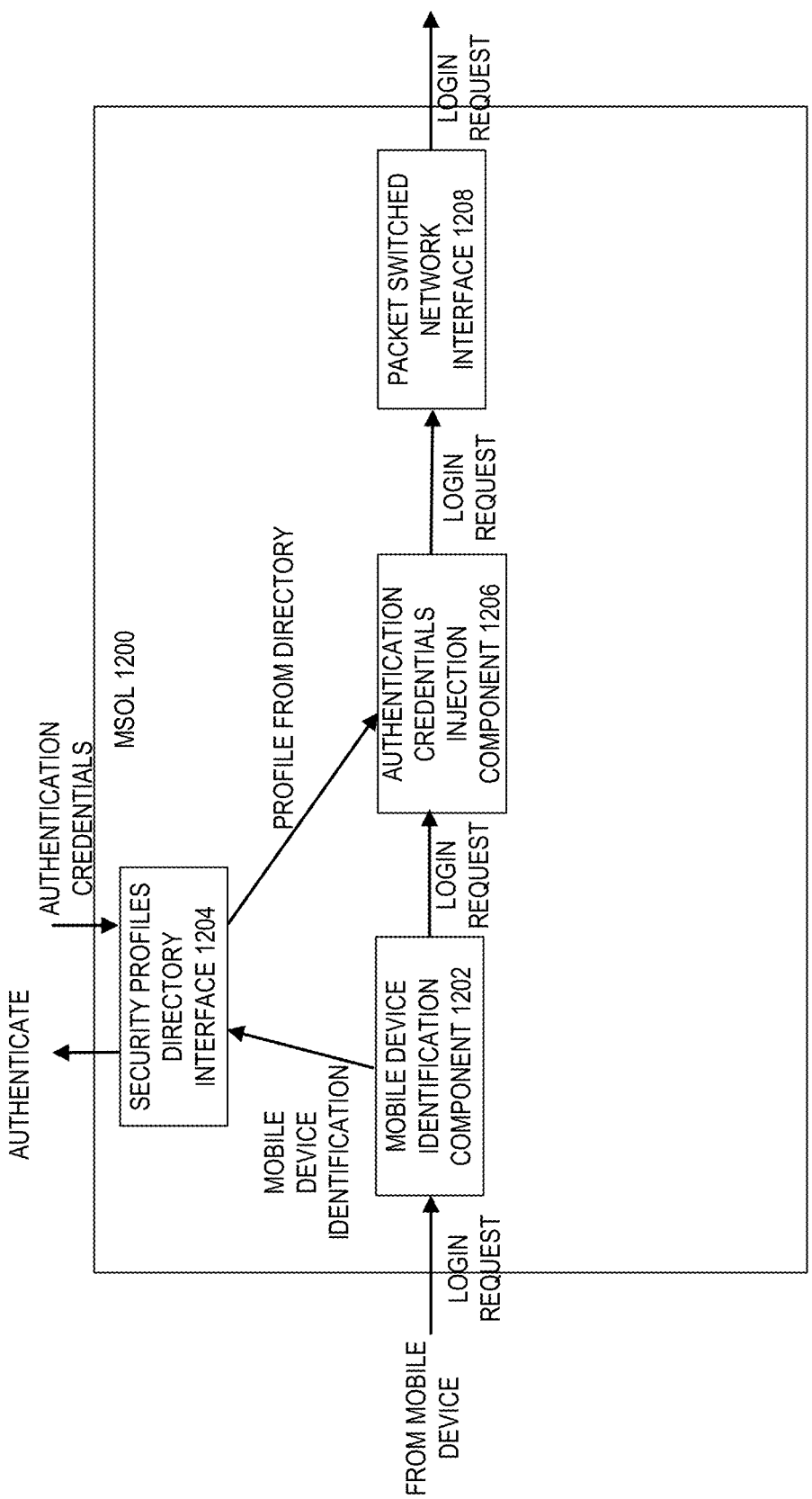
FIG. 12 is a block diagram illustrating a MSOL capable of adding network credentials to a login process in accordance with an example embodiment.

FIG. 12 is a block diagram illustrating a MSOL 1200 capable of adding network credentials to a login process, in accordance with an example embodiment. The MSOL 1200 may contain a mobile device identification component 1202, which acts to identify a mobile device 1102 that has sent a request for a login process to a secured server 1112 (that has been intercepted by the MSOL 1200). Part of this identification may include the network identity of the mobile device 1102 such as an IMSI A security profiles directory interface 1204 then passes the identity to a security profiles directory 204, which acts to create authentication credentials based on the identity, and return the authentication credentials to the MSOL 1200. An authentication credentials injection component 1206 then injects the authentication credentials into the request to begin a login process. A packet switched network interface 1208 then routes the request to begin a login process to a secured server 1112 via a packet switched network.

It should be noted that the MSOL 1200 and MSOL 202 may be separate components, or in some example embodiments there may be a combined MSOL having all the components in either MSOL 202 or MSOL 1200 that performs all the functions thereof.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application 310 or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet 1110) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications 310 and so forth described in conjunction with FIGS. 1-12 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device 1102, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 13:
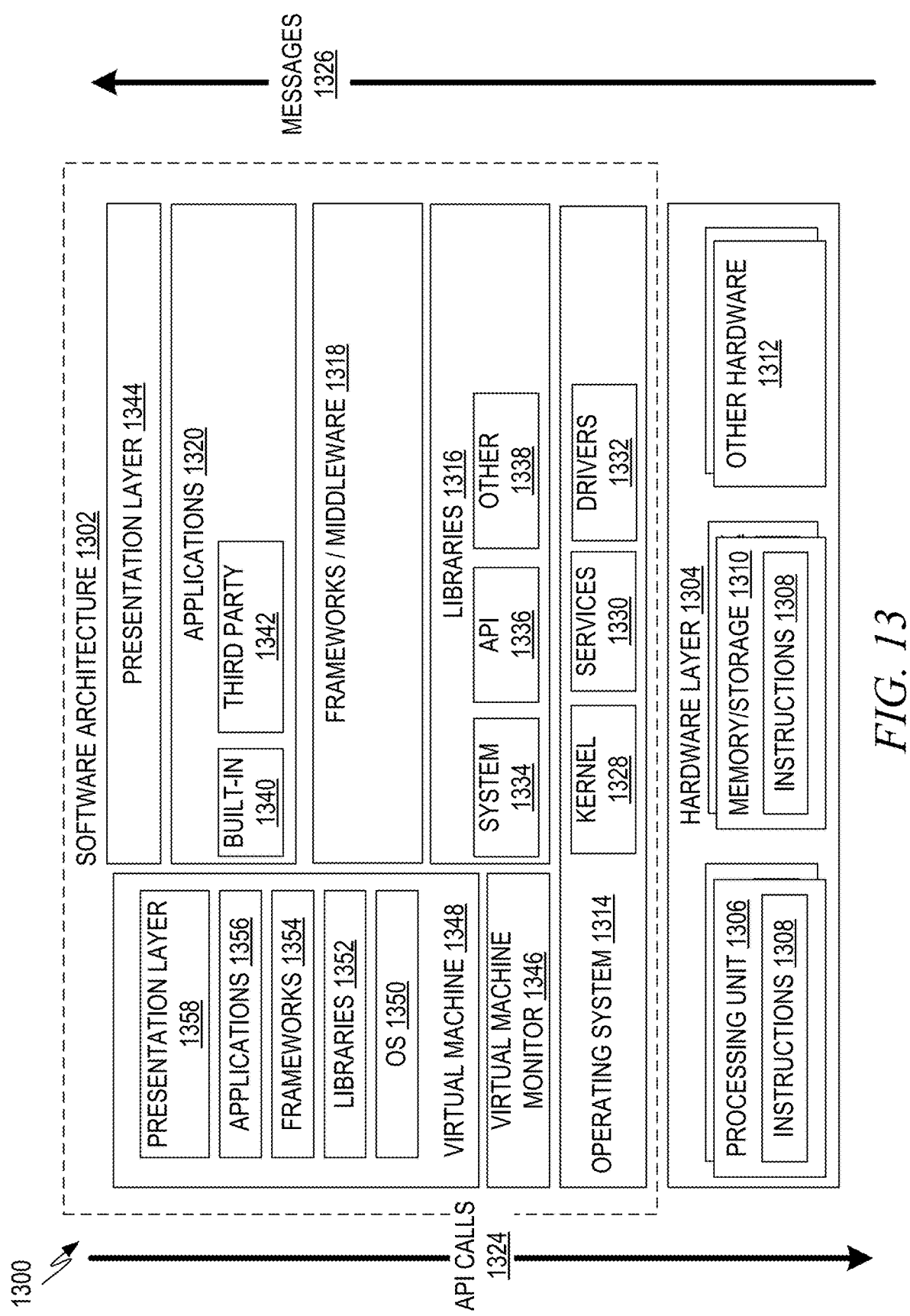
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture 1302 and it will be appreciated that many other architectures may be implemented to facilitate the functionality described herein. The software architecture 1302 may be executing on hardware such as machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. Executable instructions 1308 represent the executable instructions of the software architecture 1302, including implementation of the methods, modules and so forth of FIGS. 1-12. Hardware layer 1304 also includes memory and/or storage modules 1310, which also have executable instructions 1308. Hardware layer 1304 may also comprise other hardware 1312 which represents any other hardware of the hardware layer 1304, such as the other hardware illustrated as part of machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320 and presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems 1314 may not provide a frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks/middleware 1318 (also sometimes referred to as middleware) may provide a higher-level common infrastructure that may be utilized by the applications 1320 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1320 and/or other software components/modules, some of which may be specific to a particular operating system 1314 or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. Third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system 1314 such as iOS™, Android™ Windows® Phone, or other mobile operating systems 1314. In this example, the third-party application 1342 may invoke the API calls 1324 provided by the mobile operating system such as operating system 1314 to facilitate functionality described herein.

The applications 1320 may utilize built-in operating system functions (e.g., kernel 1328, services 1330 and/or drivers 1332), libraries (e.g., system libraries 1334, API libraries 1336, and other libraries 1338), frameworks/middleware 1318 to create user interfaces to interact with users of the system. Alternatively, or additionally, in some systems, interactions with a user may occur through a presentation layer, such as presentation layer 1344. In these systems, the application/module "logic" can be separated from the aspects of the application/module that interact with a user.

Some software architectures utilize virtual machines. In the example of FIG. 13, this is illustrated by virtual machine 1348. A virtual machine 1348 creates a software environment where applications/modules can execute as if they were executing on a hardware machine (such as the machine 1400 of FIG. 14, for example). A virtual machine 1348 is hosted by a host operating system (operating system 1314 in FIG. 13) and typically, although not always, has a virtual machine monitor 1346, which manages the operation of the virtual machine 1348 as well as the interface with the host operating system (i.e., operating system 1314). A software architecture executes within the virtual machine 1348 such as an operating system 1350, libraries 1352, frameworks/middleware 1354, applications 1356 and/or presentation layer 1358. These layers of software architecture executing within the virtual machine 1348 can be the same as corresponding layers previously described or may be different.

Example Machine Architecture and Machine-Readable Medium

Figure 14:
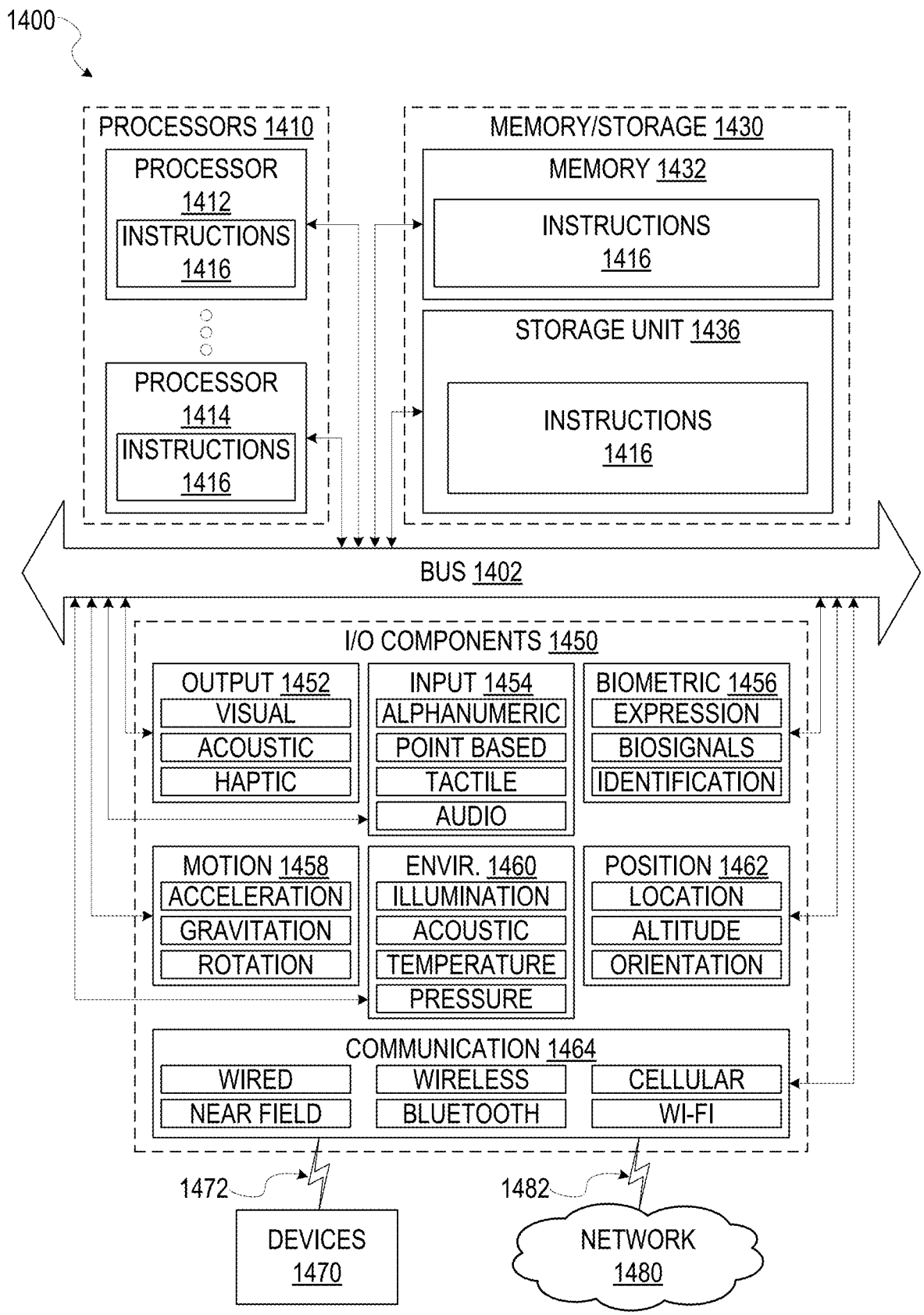
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions 1416 from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application 1356, an applet, an app, or other executable code) for causing the machine 1400 to perform methodologies described above with respect to the endpoints (e.g., mobile devices 1102, device in the external networks) described above. The instructions 1416 transform the general, non-programmed machine 1400 into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device 1102, a wearable device (e.g., a smart watch), a smart home device (e.g., a smart appliance), other smart devices, a web appliance, a network router, a network switch, a network bridge, or any machine 1400 capable of executing the instructions 1416, sequentially or otherwise, that specify actions to be taken by machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1412 and processor 1414 that may execute instructions 1416. The term "processor" is intended to include multi-core processors 1412, 1414 that may comprise two or more independent processors 1412, 1414 (sometimes referred to as "cores") that may execute instructions 1416 contemporaneously. Although FIG. 14 shows multiple processors 1410, the machine 1400 may include a single processor 1412, 1414 with a single core, a single processor 1412, 1414 with multiple cores (e.g., a multi-core processor 1412, 1414), multiple processors 1412, 1414 with a single core, multiple processors 1412, 1414 with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor 1412, 1414's cache memory), or any suitable combination thereof, during execution thereof by the machine 1400. Accordingly, the memory 1432, the storage unit 1436, and the memory of processors 1410 are examples of machine-readable media.

As used herein, "machine-readable medium" means a device able to store instructions 1416 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions 1416, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine 1400. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via coupling 1482 and coupling 1472 respectively. For example, the communication components 1464 may include a network interface component or other suitable device to interface with the network 1480. In further examples, communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet 1110, a portion of the Internet 1110, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or other type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to devices 1470. The term "transmission medium" shall be taken to include any intangible medium that is capable of storing, encoding, or carrying instructions 1416 for execution by the machine 1400, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    receiving, at a Mobile Security Offloader (MSOL) operating on a computer, unencrypted data from a mobile device in a mobile radio network, the unencrypted data transmitted from the mobile device via Code Division Multiple Access (CDMA), Global System for Mobiles (GSM), or Universal Mobile Telecommunications System (UMTS);
    determining a unique mobile device identification of the mobile device from the unencrypted data;
    using the unique mobile device identification to retrieve a security profile corresponding to the unique mobile device identification from a security profile directory, the security profile identifying a security protocol for encrypting data from the mobile device corresponding to the unique mobile device identification;
    encrypting the unencrypted data using the security protocol identified in the security profile; and
    routing the encrypted data to a secured server identified in the data via a packet switched network.

2. The method of claim 1, wherein the unique mobile device identification is an International Mobile Subscriber Identity (IMSI).

3. The method of claim 1, wherein the unique mobile device identification is a Mobile Station International Subscriber Directory Number (MSISDN).

4. The method of claim 1, wherein the unique mobile device identification is a telephone number.

5. The method of claim 1, further comprising:
    receiving encrypted response data from the secured server; and
    decrypting the encrypted response data based on the security profile.

6. The method of claim 5, further comprising storing the security profile in a cache on the MSOL.

7. The method of claim 1, wherein the mobile radio network is a 2G/3G network and the unencrypted data is received via a Serving General Packet Radio Service (GPRS) Support Node (SGSN).

8. The method of claim 1, wherein the mobile radio network is a 4G network and the unencrypted data is received via a Serving Gateway (SGW).

9. The method of claim 1, wherein the security profile is shared among multiple unique mobile device identifications and contains a field identifying the multiple unique mobile device identifications.

10. The method of claim 1, wherein the security profiles directory contains another security profile identifying a different security protocol for encrypting data from a corresponding mobile device.

11. A mobile security offloader (MSOL), comprising:
    a mobile device identification receiver component operating on a computer and configured to receive unencrypted data from a mobile device in a mobile radio network and to determine a unique mobile device identification of the mobile device from the unencrypted data;
    a security profiles directory interface operating on the computer and configured to use the unique mobile device identification to retrieve a security profile corresponding to the unique mobile device identification from a security profiles directory, the security profile identifying a security protocol for encrypting data from the mobile device corresponding to the unique mobile device identification;
    an encryption engine executable by one or more processors on the computer and configured to encrypt the unencrypted data using the security protocol identified in the security profile; and
    a packet switched network interface operating on the computer and configured to route the encrypted data to a secured server identified in the data via a packet switched network.

12. The MSOL of claim 11, wherein the packet switched network interface is further configured to receive encrypted response data from the secured server and wherein the encryption engine is further configured to decrypt the encrypted response data based on the security profile.

13. The MSOL of claim 12, wherein the security profiles directory interface is further configured to store the security profile in a cache on the MSOL.

14. The MSOL of claim 11, wherein the mobile radio network is a 2G/3G network and the unencrypted data is received via a Serving General Packet Radio Service (GPRS) Support Node (SGSN).

15. The MSOL of claim 11, wherein the mobile radio network is a 4G network and the unencrypted data is received via a Serving Gateway (SGW).

16. The MSOL of claim 11, wherein the security profile is shared among multiple unique mobile device identifications and contains a field identifying the multiple unique mobile device identifications.

17. The MSOL of claim 11, wherein the security profiles directory contains another security profile identifying a different security protocol for encrypting data from a corresponding mobile device.

18. A Mobile Security Offloader (MSOL) comprising:
   a mobile device identification receiver component operating on a computer and configured to receive, from a mobile device via a mobile radio network, a request to begin a login process on a secured server and to determine a unique mobile device identification of the mobile device from the request;
   a security profiles directory interface operating on the computer and configured to use the unique mobile device identification to authenticate the mobile device with a security profiles directory and to receive authentication credentials from the security profiles directory in response to the authentication; and
   an authentication credentials injector operating on the computer and executable by one or more processors and configured to inject the authentication credentials into the request to begin the login process; and
   a packet switched network interface operating on the computer and configured to route the request to begin the login process to the secured server via a packet switched network.

19. The MSOL of claim 18, wherein the packet switched network interface is further configured to receive a login success message from the secured server and to forward the login success message to the mobile device via the mobile radio network.

20. A method comprising:
   receiving, at a Mobile Security Offloader (MSOL), a request to begin a login process on a secured server from a mobile device via a mobile radio network;
   determining a unique mobile device identification of the mobile device from the request;
   using the unique mobile device identification to obtain authentication credentials corresponding to the unique mobile device identification from a security profile directory;
   injecting the authentication credentials into the request to begin the login process; and
   routing the request to begin the login process to the secured server via a packet switched network.

21. The method of claim 20, wherein the unique mobile device identification is an International Mobile Subscriber Identity (IMSI).

22. The method of claim 20, wherein the unique mobile device identification is a Mobile Station International Subscriber Directory Number (MSISDN).

23. The method of claim 20, further comprising:
   receiving a login success message from the secured server and to forward the login success message to the mobile device via the mobile radio network.

* * * * *